United States Patent
Badeau et al.

(10) Patent No.: US 6,776,814 B2
(45) Date of Patent: Aug. 17, 2004

(54) DUAL SECTION EXHAUST AFTERTREATMENT FILTER AND METHOD

(75) Inventors: Kurt M. A. Badeau, Evansville, WI (US); William C. Haberkamp, Cookeville, TN (US)

(73) Assignee: Fleetguard, Inc., Nashville, TN (US)

(*) Notice: Subject to any disclaimer, the term of this patent is extended or adjusted under 35 U.S.C. 154(b) by 148 days.

(21) Appl. No.: 09/851,300

(22) Filed: May 8, 2001

(65) Prior Publication Data

US 2002/0090324 A1 Jul. 11, 2002

Related U.S. Application Data

(63) Continuation-in-part of application No. 09/522,152, filed on Mar. 9, 2000, now Pat. No. 6,669,913.

(51) Int. Cl.[7] .......................... B01D 29/52; B01D 29/54
(52) U.S. Cl. .......................... 55/385.3; 55/483; 55/484; 55/499; 55/521; 55/524; 55/525; 55/523; 55/DIG. 28; 55/DIG. 30; 60/311; 422/179; 422/180
(58) Field of Search .......................... 55/483, 484, 499, 55/521, 524, 525, DIG. 30, 385.3, 523, DIG. 28; 60/311; 422/179, 180

(56) References Cited

U.S. PATENT DOCUMENTS

| | | |
|---|---|---|
| 1,893,372 A | 1/1933 | Kryzanowsky |
| 1,924,472 A | 8/1933 | Thomson |
| 2,410,371 A | 10/1946 | Vokes |
| 2,553,054 A | 5/1951 | Lincoln et al. |
| 3,025,964 A | 3/1962 | Summers et al. |
| 3,441,381 A | 4/1969 | Keith et al. |
| 3,692,184 A | 9/1972 | Miller, Jr. et al. |
| 3,708,957 A | 1/1973 | Labadie |
| 3,799,354 A | 3/1974 | Buckman et al. |
| 3,844,749 A | 10/1974 | Carter, Sr. |
| 3,958,967 A | 5/1976 | Nakamura |
| 4,017,347 A | 4/1977 | Cleveland |

(List continued on next page.)

FOREIGN PATENT DOCUMENTS

| | | |
|---|---|---|
| DE | 102 02 005 | 8/2002 |
| EP | 1 132 587 | 9/2001 |

(List continued on next page.)

OTHER PUBLICATIONS

Patent Abstracts of Japan 60–161713, Aug. 23, 1985 (Nichias Corp.), Filter and Its Preparation.

Primary Examiner—Minh-Chau T. Pham
(74) Attorney, Agent, or Firm—Andrus, Sceales, Starke & Sawall, LLP

(57) ABSTRACT

An exhaust aftertreatment filter (100) is provided for internal combustion engine exhaust, and includes an axially extending cylindrical filter roll (106) having pleated filter media (110) defining a plurality of axially extending flow channels (130), and having a first open-flow section (142) with open flow channels (140), and a second filtering section (148) with alternately sealed flow channels (136, 138) forcing exhaust to flow through (158) the pleated filter media (110). A core section (142) aides filter regeneration by providing an exothermic reaction. A combination catalytic converter and filter includes a first catalytic section (142) treated with a catalyst, and a second filter section (148) with alternately sealed flow channels (136, 138).

14 Claims, 6 Drawing Sheets

U.S. PATENT DOCUMENTS

| | | | |
|---|---|---|---|
| 4,056,375 A | 11/1977 | Ringel et al. | |
| 4,130,487 A | 12/1978 | Hunter et al. | |
| 4,157,902 A | 6/1979 | Tokar | |
| 4,370,855 A | 2/1983 | Tuggle | |
| 4,410,427 A | 10/1983 | Wydevan | |
| 4,419,108 A | 12/1983 | Frost et al. | |
| 4,430,223 A | 2/1984 | Miyakawa et al. | |
| 4,441,899 A | 4/1984 | Takagai et al. | |
| 4,455,823 A | 6/1984 | Bly et al. | |
| 4,498,989 A | 2/1985 | Miyakawa et al. | |
| 4,548,626 A | 10/1985 | Ackley et al. | |
| 4,589,983 A | 5/1986 | Wydevan | |
| 4,619,675 A | 10/1986 | Watanabe | |
| 4,652,286 A | 3/1987 | Kusuda et al. | |
| 4,864,821 A | 9/1989 | Hoch | |
| RE33,118 E | 11/1989 | Scheitlin et al. | |
| 4,878,929 A | 11/1989 | Tofsland et al. | |
| 4,902,487 A | 2/1990 | Cooper et al. | |
| 4,925,561 A | 5/1990 | Ishii et al. | |
| 4,960,449 A | 10/1990 | Yonushonis | |
| 5,008,086 A | 4/1991 | Merry | |
| 5,014,509 A | 5/1991 | Broering et al. | |
| 5,015,376 A | 5/1991 | Picek | |
| 5,030,263 A | 7/1991 | Kemp | |
| 5,035,236 A | 7/1991 | Kanegaonkar | |
| 5,052,178 A | 10/1991 | Clerc et al. | |
| 5,063,736 A | 11/1991 | Hough et al. | |
| 5,082,479 A | 1/1992 | Miller | |
| 5,106,397 A | 4/1992 | Jaroszczyk et al. | |
| 5,137,696 A | 8/1992 | Hitachi et al. | |
| 5,174,895 A | 12/1992 | Drori | |
| 5,177,962 A | 1/1993 | Hall et al. | |
| 5,252,299 A | 10/1993 | Retallick | |
| D342,990 S | 1/1994 | Jaroszczyk | |
| 5,298,046 A | 3/1994 | Peisert | |
| 5,304,351 A | 4/1994 | Tanaka et al. | |
| 5,322,537 A | 6/1994 | Nakamura et al. | |
| 5,346,675 A | 9/1994 | Usui et al. | |
| 5,380,501 A | 1/1995 | Hitachi et al. | |
| 5,385,873 A | 1/1995 | MacNeill | |
| 5,468,384 A | 11/1995 | Garcera et al. | |
| 5,480,621 A | 1/1996 | Breuer et al. | |
| 5,519,993 A | 5/1996 | Rao et al. | |
| 5,546,069 A | 8/1996 | Holden et al. | |
| 5,549,722 A | 8/1996 | Zemaitis et al. | |
| 5,562,825 A | 10/1996 | Yamada et al. | |
| 5,632,792 A | 5/1997 | Haggard | |
| 5,772,883 A | 6/1998 | Rothman et al. | |
| 5,792,247 A | 8/1998 | Gillingham et al. | |
| 5,820,646 A | 10/1998 | Gillingham et al. | |
| 5,846,641 A | 12/1998 | Abeles et al. | |
| 5,863,311 A | 1/1999 | Nagai et al. | |
| 5,866,859 A | 2/1999 | Karlsson et al. | |
| 5,891,402 A | 4/1999 | Sassa et al. | |
| 5,902,364 A | 5/1999 | Tokar et al. | |
| 5,908,480 A | 6/1999 | Ban et al. | |
| 5,925,561 A | 7/1999 | Posselius, Jr. et al. | |
| 5,961,931 A | 10/1999 | Ban et al. | |
| 6,013,599 A | 1/2000 | Manson | |

FOREIGN PATENT DOCUMENTS

| | | | |
|---|---|---|---|
| GB | | 563768 | 2/1943 |
| WO | WO 88/03431 | | 5/1988 |
| WO | | 01/04466 | 1/2001 |

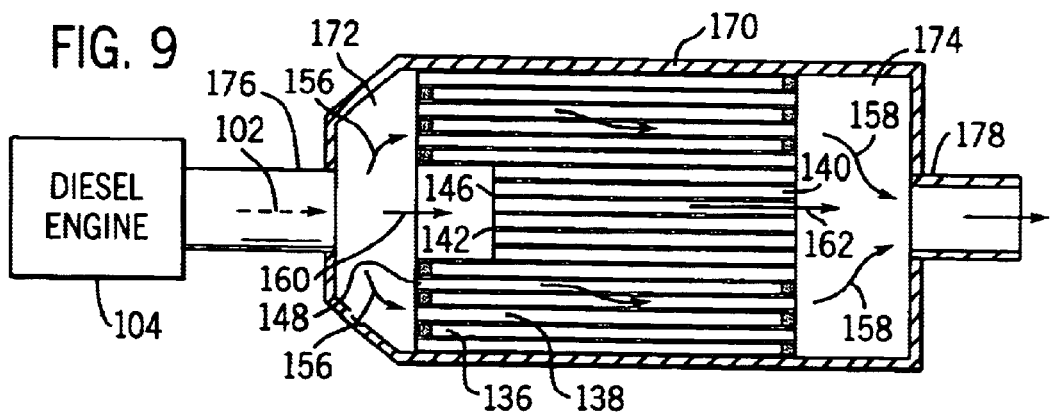
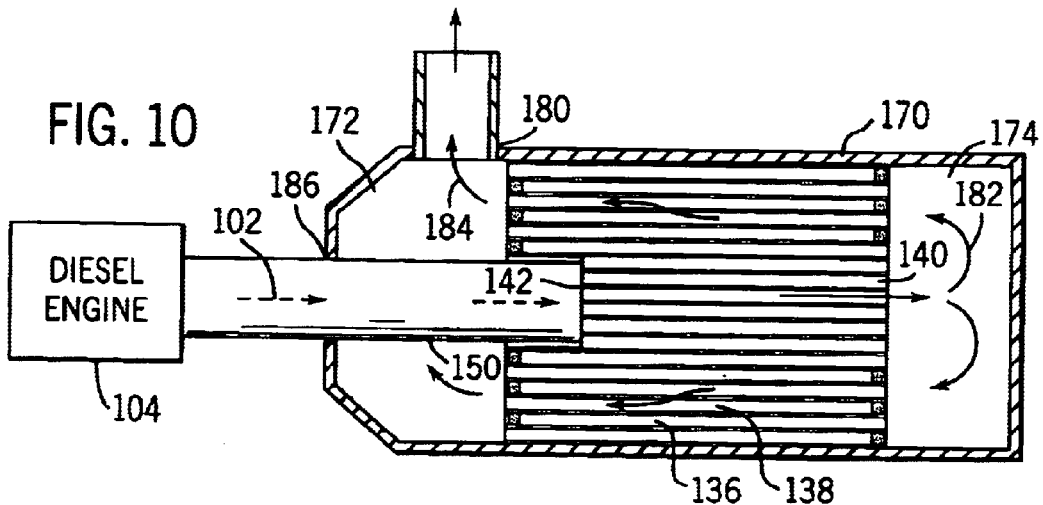

A # DUAL SECTION EXHAUST AFTERTREATMENT FILTER AND METHOD

CROSS-REFERENCE TO RELATED APPLICATION

This application is a continuation-in-part of U.S. patent application Ser. No. 09/522,152, filed Mar. 9, 2000 now U.S. Pat. No. 6,669,913.

BACKGROUND AND SUMMARY

The invention relates to exhaust aftertreatment filters for internal combustion engines, including diesel engines.

The invention of the noted parent '152 application relates to exhaust emission devices for internal combustion engines, including diesel engines, and more particularly to catalytic converters and to filters. Various diesel exhaust aftertreatment systems require that the exhaust be directed through a catalytic component and also through a filter component to achieve emissions and/or particulate (e.g. soot) reduction. The parent invention provides a simple system combining these devices in a singular unit. In a desirable aspect, the parent invention further maintains exact axial alignment of the catalytic and filter flow channels and simplifies packaging.

The present invention initially grew out of attempts to solve customer-reported problems with stalled trucks due to clogged exhaust filters. It is known in the prior art to provide a cylindrical filter roll having a hollow center and a surrounding annulus with axially extending alternately sealed flow channels providing the filtering function. The hollow center or core is plugged, to block flow therethrough, and force exhaust to flow through the filter section. During usage, as the filter section becomes clogged, the truck may stall. One possible solution is to eliminate the central blocking plug. However, this may weaken the unit by eliminating the central structural support provided by such plug, and also leads to increased particulate emission, i.e. a portion of the exhaust would be unfiltered. The present invention provides various solutions and trade-offs in combination. In one desirable combination, a combined catalytic converter and filter is provided. In another desirable combination, improved filter regeneration is provided. Other desirable aspects and features will become apparent upon review of the following specification.

BRIEF DESCRIPTION OF THE DRAWINGS

Parent Invention

Present Invention

Figure 5:
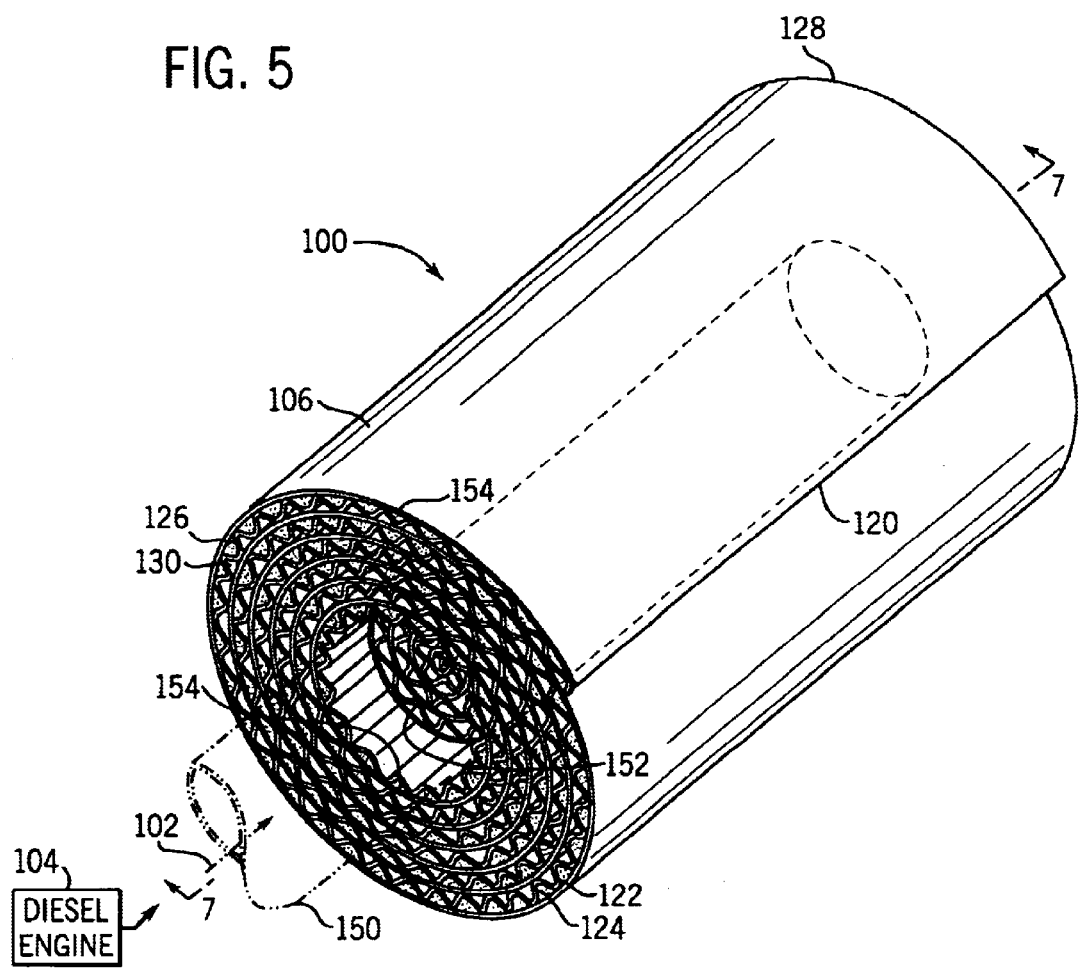

FIG. 5 is a perspective assembly view of an exhaust aftertreatment filter in accordance with the present invention.

Figure 6:
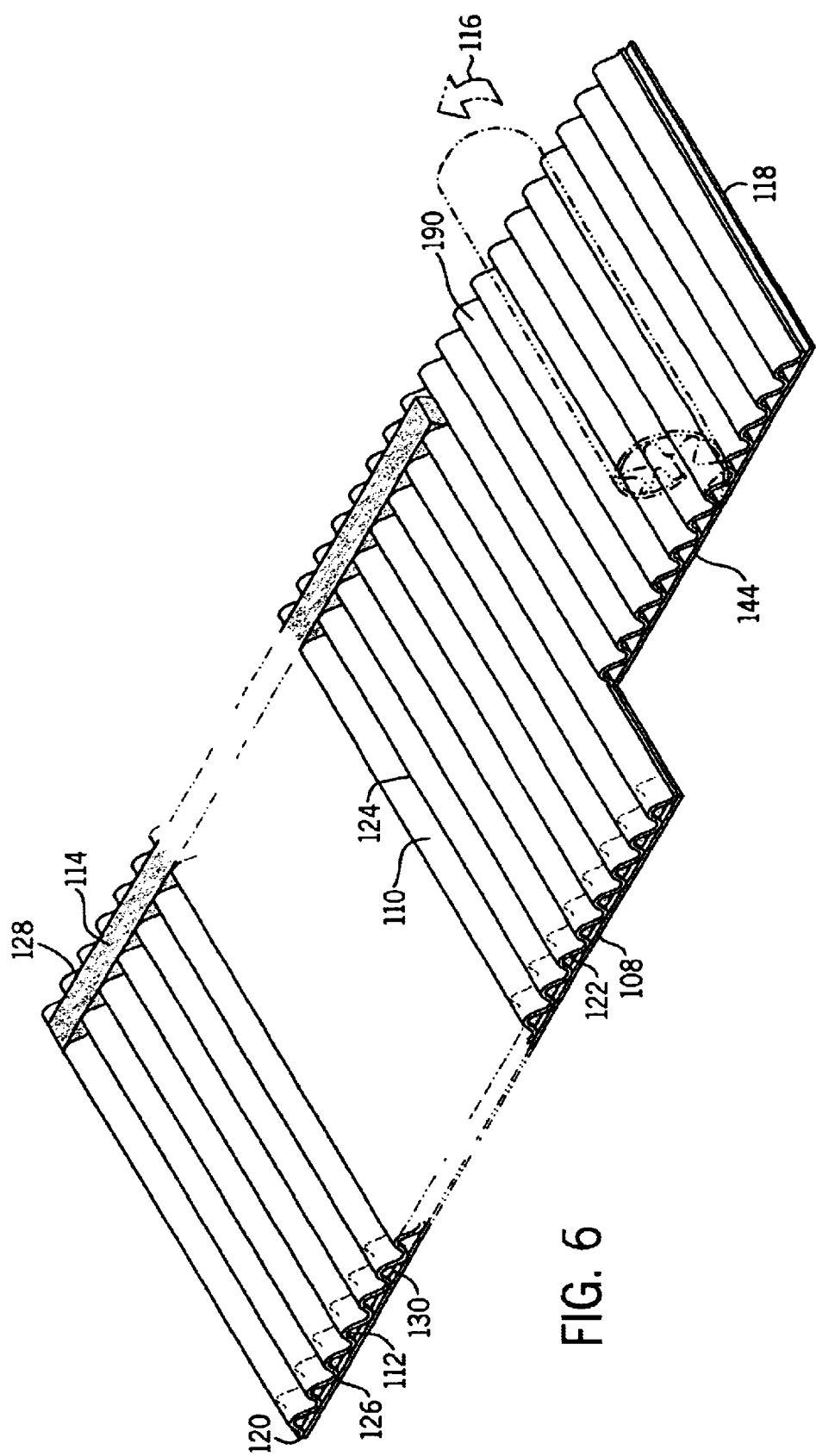

FIG. 6 is a perspective view showing an assembly step in making the filter roll of FIG. 5.

Figure 7:
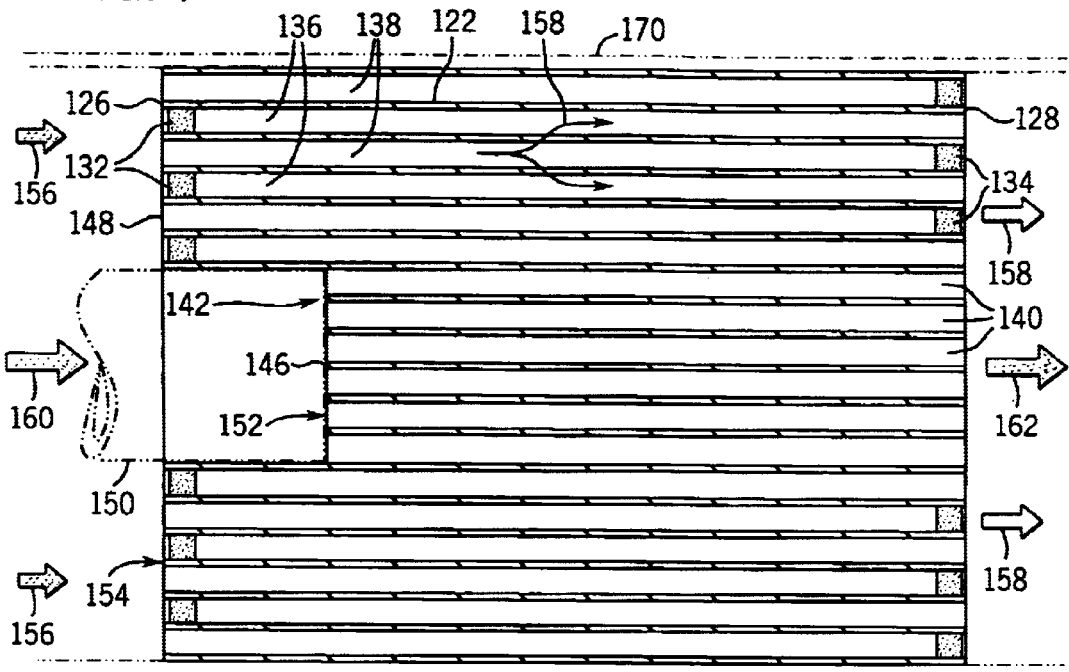

FIG. 7 is a sectional view taken along line 7—7 of FIG. 5.

Figure 8:
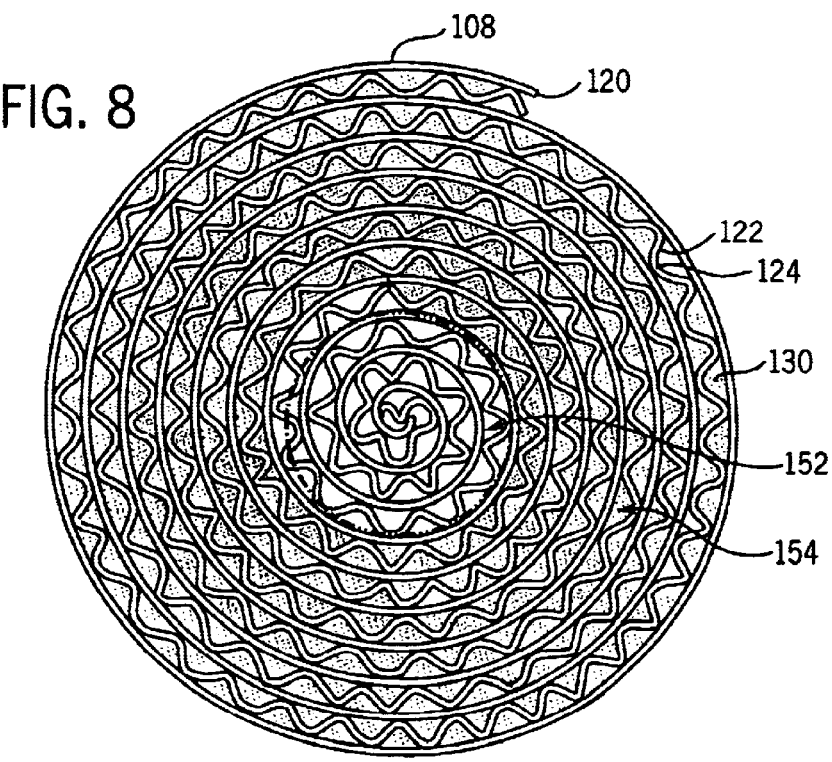

FIG. 8 is an end elevation view of the filter roll of FIG. 5.

FIG. 9 is a sectional view like FIG. 7 and schematically shows a housing combination.

FIG. 10 is like FIG. 9 and shows another embodiment.

DETAILED DESCRIPTION

Parent Invention

FIGS. 1–4 and the following description thereof are taken from parent U.S. patent application Ser. No. 09/522,152, filed Mar. 9, 2000.

Figure 1:
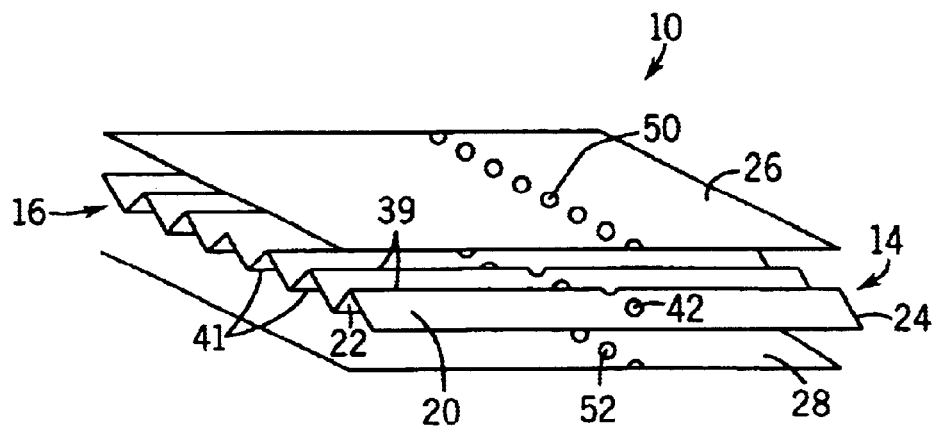
FIG. 1 is an exploded perspective view of a combination catalytic converter and filter in accordance with the invention of parent U.S. application Ser. No. 09/522,152, filed Mar. 9, 2000.
Figure 2:
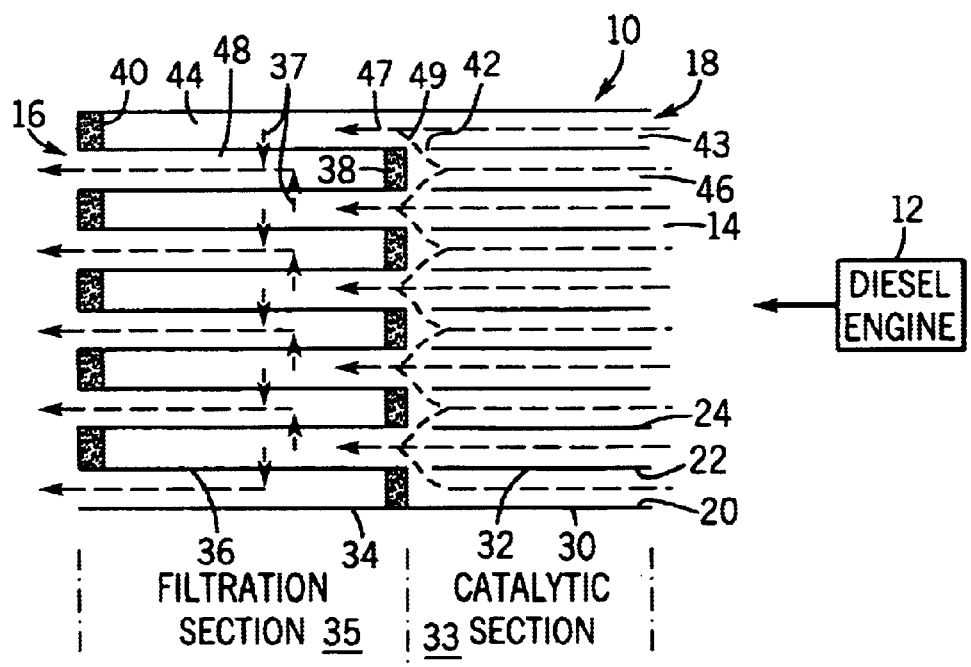
FIG. 2 is a sectional view from above of the device of FIG. 1.

FIGS. 1 and 2 show a combination catalytic converter and filter 10 for an internal combustion engine such as diesel engine 12. The combination catalytic converter and filter is provided by a single unitary flow member having an upstream frontside 14 and a downstream backside 16. Member 10 has a plurality of flow channels 18 extending axially from upstream frontside 14 to downstream backside 16. Each channel has left and right sidewalls such as 20 and 22 formed by pleated filter media 24, and top and bottom walls formed by respective upper and lower boundary layers 26 and 28. Left and right sidewalls 20 and 22 extend axially continuously from upstream frontside 14 to downstream backside 16. The sidewalls have upstream sections 30, 32, etc. proximate frontside 14, and downstream sections 34, 36, etc. proximate backside 16. Upstream sections 30, 32, etc. provide a catalytic section 33 treated with a catalyst for the exhaust. Downstream sections 34, 36, etc. provide a filter section 35 and have axially spaced alternately blocking sealants 38, 40, etc. in alternate channels such that exhaust flow must pass through pleated filter media 24 in filter section 35, as shown at arrows such as 37. Each of left and right sidewalls 20, 22, etc. extends axially rectilinearly from catalytic section 33 to filter section 35, maintaining exact axial alignment of the respective channels including the catalyzing and filtering sections thereof. Pleated filter media 24 is a continuous sheet spanning both catalytic section 33 and filter section 35.

In one preferred embodiment, catalytic section 33 is upstream of filter section 35. A first set of alternating blocking sealants 38, etc. are at the upstream ends of respective channels in filter section 35, and a second set of alternating blocking sealants 40, etc. are at downstream ends of respective channels in filter section 35. In this embodiment, it is preferred that the sidewalls of the channels of catalytic section 33 are perforated as shown at 42 such that exhaust flows through catalytic section 33 along a first set of alternate channels such as 43 rectilinearly aligned with a first set of alternate channels such as 44 in filter section 35, and exhaust also flows through catalytic section 33 along a second set of alternate channels such as 46 laterally offset from first set of channels 43 and communicating therewith through the perforations 42, such that exhaust flows through all of the channels of catalytic section 33 notwithstanding the noted alternating blocking sealants 38, 40 in filter section 35. Exhaust flow through all of the channels of catalytic section 33 is desirable to increase surface area for catalytic activity. In this embodiment, the noted first set of alternate channels 43 in catalytic section 33 are open at their downstream ends 47, and exhaust flows rectilinearly from such first set of channels 43 in catalytic section 33 to first set of alternate channels 44 in filter section 35. The downstream ends of the first set of channels 44 in filter section 35 are blocked by the noted second set of alternating blocking sealants 40. The noted second set of alternate channels 46 in catalytic section 33 are blocked at their downstream end by the noted first set of alternating blocking sealants 38 in the upstream ends of second set of alternate channels 48 in filter section 35. Perforations 42 are upstream of the noted first set of alternating blocking sealants 38, such that exhaust flows axially along the noted second set of channels 46 in catalytic section 33 and then laterally through perforations 42 as shown in dashed line at arrows such as 49 in FIG. 2 and joins the flow in the first set of channels 43 in catalytic section 33 flowing axially rectilinearly into the noted first set of channels 44 in filter section 35. Sealant is applied along the upper pleat tips as shown at 39 downstream of perforations 42, to seal the upper tips of pleated filter media 24 to upper boundary layer 26. Sealant is applied along the lower pleat tips as shown at 41 downstream of perforations 42, to seal the lower tips of pleated filter media 24 to lower boundary layer 28.

Figure 3:
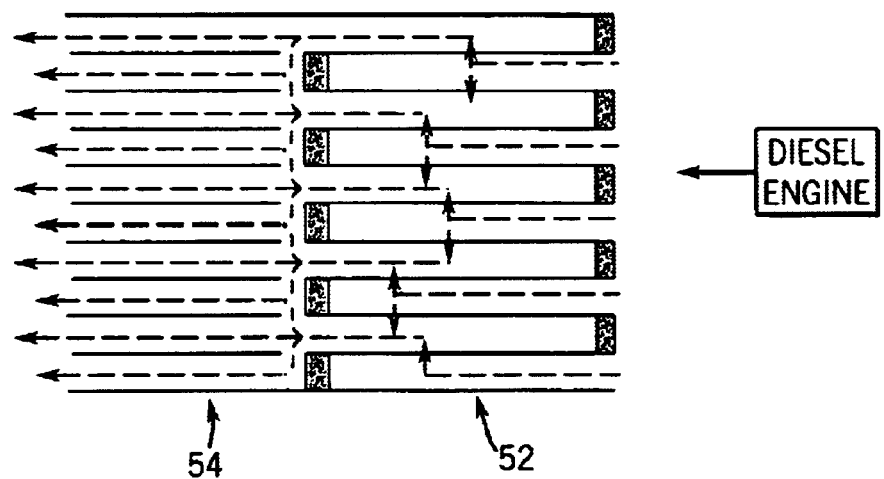
FIG. 3 is a view like FIG. 2 and shows another embodiment.
Figure 4:
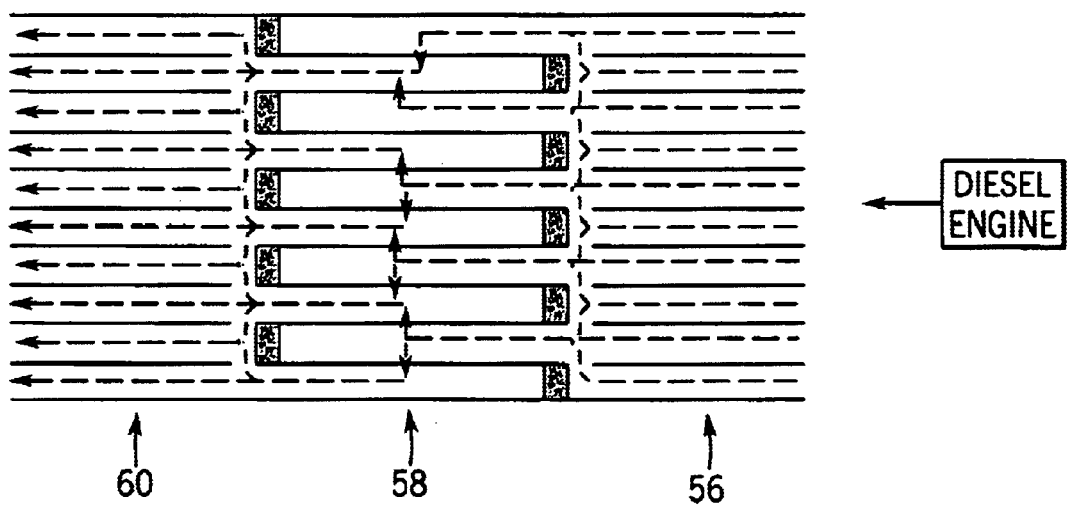
FIG. 4 is a view like FIG. 2 and shows another embodiment.

In another embodiment, the catalytic section may be downstream of the filter section, as shown in FIG. 3 at upstream filter section 52 and downstream catalytic section 54. In a further embodiment, a second catalytic section may be added to the configuration of FIG. 2 downstream of the filter section, such that a filter section is nested between two catalytic sections, i.e. catalyst/filter/catalyst, for example as shown in FIG. 4 at upstream catalytic section 56, downstream filter section 58 and further downstream catalytic section 60. In another embodiment, the filter section of the unitary member is treated with a catalyst. For example, in FIG. 2, filter section 35 is further treated with a catalyst to oxide soot or collected contaminant, while the catalytic exhaust. Thus, the device is provided with different catalytic treatments at different sections so that separate functions occur. In further embodiments, filter sections 52, FIG. 3 and 58, FIG. 4, may also be provided with catalytic treatment. Other combinations and sequencing are possible.

In preferred form, the device of FIG. 1 is wrapped in a spiral, for example as shown in U.S. Pat. Nos. 4,652,286 and 5,908,480, incorporated herein by reference, to provide a multilayered structure. In such embodiment, one of the upper or lower boundary layers 26 or 28 may be eliminated, because in a spiral wrap the remaining layer provides the boundary for the channels on opposite sides thereof. Boundary layers 26 and/or 28 may be formed of a sheet of filter media or may be impervious to the exhaust flow. Boundary layers 26 and/or 28 may be perforated as shown at 50 and 52 which perforations are laterally aligned with perforations 42. In another embodiment, the single row of channels in FIG. 1 may be stacked, for example as shown in incorporated U.S. Pat. No. 4,652,286, to provide a plurality of rows and columns of channels. In such stacked structure one of the boundary layers 26 or 28 may be eliminated because the remaining layer will provide a boundary layer for the channels on opposite sides thereof, e.g. if top layer 26 is omitted, then layer 28 of the second row of channels will provide the bottom wall for such second row of channels and will provide the top wall for the first row of channels therebelow.

Present Invention

FIG. 5 shows an exhaust aftertreatment filter 100 for filtering internal combustion engine exhaust flowing along an axial direction 102, for example exhaust from diesel engine 104. The filter is provided by an axially extending cylindrical filter roll 106 spiral-wound from a sheet 108, FIG. 6, having corrugated pleats 110 thereon. First and second axially spaced sealing beads 112 and 114, provided by adhesive sealant or the like, extend laterally across the pleats, one of the beads such as 112 being beneath the pleats, and the other bead such as 114 being on the upper surface of the pleats. The sheet is wound as shown at arrow 116 from a starting side 118 to a terminating side 120, such that the filter roll has a plurality of concentric layers with pleats therebetween defined by wall segments 122, FIG. 8, extending radially in corrugated serpentine manner between pleat tips at axially extending bend lines 124. Wall segments 122 extend axially between first and second distally opposite axial ends 126 and 128, FIGS. 5–7, and define axial flow channels 130 therebetween. Sealing beads 112 and 114 provide first and second sets of plugs 132 and 134, FIG. 7, alternately sealing flow channels 130. Wall segments 122 are alternately sealed to each other by the first set of plugs 132 to define a first set of flow channels 136 closed by plugs 132 and a second set of flow channels 138 interdigitated with first set of flow channels 136 and having open left axial ends in FIG. 7. Wall segments 122 are alternately sealed to each other by the noted second set of plugs 134 axially spaced from first set 132 and closing the noted second set of flow channels 138. First set of flow channels 136 have open rightward axial ends in FIG. 7. The filter construction described thus far is known in the prior art.

In the preferred embodiment, sealing beads 112 and 114 are laterally spaced from starting side 118, leftwardly in FIG. 6, to provide, after the noted rolling at 116, a third set of flow channels 140, FIG. 7, as open unsealed flow channels through an inner central section 142 of the filter roll when wound. Also in the preferred embodiment, sheet 108 and pleats 110 have a cut-out section 144, FIG. 6, along starting side 118 and along left axial end 126, such that after winding, the left axial ends of wall segments 122 of inner section 142 are axially recessed at 146, FIG. 7, from the left axial ends of the wall segments at outer annular section 148 of the filter roll. This is desired to provide better sealing to exhaust tube 150 from the engine, in embodiments where such exhaust tube 150 is used, to be described. The filter roll has an inner central face 152, FIGS. 8, 5, at the left axial ends of the wall segments of central inner section 142, and an outer annular face 154 at the left axial ends of the wall segments of outer section 148. Inner face 152 is spaced axially rightwardly at 146, FIG. 7, from outer face 154 at outer annular section 148. The noted third set of flow channels 140 are open at both the left and right axial ends.

Exhaust flow axially rightwardly in FIG. 7 as shown at arrows 156 flows through outer annular filtering section 148 having the noted alternately sealed flow channels 136 and 138 forcing exhaust to flow through wall segments 122 of the pleated filter media as shown at arrows 158. The exhaust flows through the open left axial ends of flow channels 138, then axially rightwardly therein, then through wall segments 122 of the pleated filter media as shown at arrows 158 into flow channels 136, then axially rightwardly in flow channels 136, and then through the open right axial ends of flow channels 136 as shown at arrows 158. Incoming exhaust flow at arrow 160 flows axially rightwardly through the open left axial ends of flow channels 140, then axially rightwardly in flow channels 140, then through open right axial ends of flow channels 140 as shown at arrow 162. Central inner section 142 is an open-flow section with open flow channels 140. Outer annular section 148 is a filtering section with alternately sealed flow channels 136, 138 forcing exhaust to flow through the pleated filter media as shown at 158. Sealing beads 112, 114 laterally spaced from starting side 118, FIG. 6, provide open-flow section 142 of filter roll 106 when wound. In an alternate embodiment, beads 112, 114 can instead be laterally spaced from terminating side 120, FIG. 6, to provide the open-flow section of the filter roll around the outer annular section thereof, and the filtering section as the central inner section.

Filter roll 106 is provided in an axially extending housing 170, FIG. 9, enclosing the filter roll and having axially distally opposite first and second plenums 172 and 174, an inlet port 176 in plenum 172, and an outlet port 178 in plenum 174. In the embodiment of FIG. 9, inlet exhaust tube 150 of FIGS. 5 and 7 is not used. Engine exhaust flows at 102 into plenum 172 from inlet port 176, and then flows in parallel as shown at arrows 160, 156 through inner and outer sections 142 and 148, respectively, of filter roll 106 to plenum 174 to exit at outlet port 178 as shown at arrows 162, 158. Engine exhaust flows as shown at arrow 160 from inlet plenum 172 through the noted third set of flow channels 140, FIG. 7, from the open left axial ends thereof to the open right axial ends thereof then into plenum 174. This central exhaust flow is not filtered, as illustrated in FIG. 7 at stippled inlet arrow 160 which remains stippled at outlet arrow 162. Engine exhaust also flows as shown at arrows 156 from inlet plenum 172, FIG. 9, into the open left axial ends of the noted second set of flow channels 138, FIG. 7, and then is filtered by passage through wall segments 122 of outer section 148 of the filter roll and then flows out of the open right axial ends of the noted first set of flow channels 136 into plenum 174. This outer annular portion of the exhaust flow is filtered as illustrated in FIG. 7 at stippled inlet arrow 156 and unstippled outlet arrow 158. In FIG. 9, the left axial ends of the central flow channels need not be recessed at 146 because there is no inlet exhaust tube 150 to seal thereat, and hence there is no need to cut-out the section at 144 in FIG. 6.

FIG. 10 shows another embodiment where it is desired to include cut-out section 144 in FIG. 6 to provide the noted recess at 146 in FIG. 7. The filter roll is provided in axially extending housing 170 having axially distally opposite plenums 172 and 174, an outlet port 180 in plenum 172, and inlet tube 150 supplying engine exhaust at 102 to the left axial end of central inner section 142 of the filter roll to supply exhaust to the left open axial ends of the noted third set of flow channels 140. Engine exhaust flows through the third set of flow channels 140 from the open left axial ends thereof to the open right axial ends thereof, then into plenum 174 wherein exhaust flow reverses as shown at 182 and flows into the open right axial ends of the first set of flow channels 136 and then is filtered by passing through wall segments 122 of the outer annular section 148 of the filter roll and flows out of the open left axial ends of the second set of flow channels 138 into plenum 172 and then to outlet port 180 as shown at arrow 184. Plenum 172 has an inlet port 186. Inlet tube 150 extends from inlet port 186 through plenum 172 to the left axial end of central inner section 142. In an alternate embodiment, the inlet and outlet of the housing in FIG. 10 may be reversed such that exhaust flows in the opposite direction, namely exhaust flows into plenum 172 from the now inlet port 180, then into the open left axial ends of the second set of flow channels 138 and then is filtered by passing through wall segments 122 of the outer annular section 148 of the filter roll and then flows out of the open right axial ends of the first set of flow channels 136 into plenum 174 wherein exhaust flow reverses and flows through the third set of flow channels 140 from the open right axial ends thereof to the open left axial ends thereof, then through the now outlet tube 150. In such embodiment, exhaust from diesel engine 104 is supplied to port 180, and port 186 is now an outlet port, with tube 150 now an outlet tube extending from the left axial end of central inner section 142 of the filter roll through plenum 172 to the now outlet port 186.

Pleated media 110 and sheet 108 of the filter are composed of regenerable material, for example ceramic material as in U.S. Pat. Nos. 4,017,347, 4,652,286, 5,322,537, and preferably of a high temperature composite ceramic material as disclosed in commonly owned co-pending U.S. patent application Ser. No. 09/573,747, filed May 18, 2000, all incorporated herein by reference. The filter is regenerated by heat, as applied by a separate gas burner, electric resistance heating, microwave energy, etc., for example as disclosed in U.S. Pat. Nos. 5,014,509, 5,052,178, 5,063,736, all incorporated herein by reference.

Corrugated central section 142 of the filter roll provides additional support, which is preferred over merely leaving such central section hollow, to provide the noted get-home feature for a truck even if the filter clogs. In addition, the starting run of pleated media 110 at 190, FIG. 6, along the span between starting side 118 and the beginning of sealing beads 112, 114, may be coated with an oxidation catalyst material, as in the noted parent '152 application, to reduce volatile organic fraction (VOF) particulate, and to act as a heater core to initiate soot light-off during operation. Central inner section 142 of the filter roll acts as a flow-through oxidation catalyst when a precious metal is applied to the pleats at 190. The particulate passing through this section would not be eliminated, but there would be reduction by oxidation of the volatile organic fraction. The added catalyst treatment may or may not be desired or needed depending upon application, such as whether the flow needs to be reversed such as in FIG. 10 for packaging or space requirements. The exothermic reaction occurring in central inner section 142 can act as a core heater to initiate filter regeneration. Upon addition of the catalytic treatment, a combination catalytic converter and filter is provided for internal combustion engine exhaust, including a first catalytic section 142 treated with a catalyst for the exhaust, and a second filter section 148 with alternately sealed flow channels 136, 138 forcing exhaust to flow through the pleated filter media. In FIG. 9, the sections are in parallel such that a first portion 160 of the exhaust flows through catalytic section 142 and is catalyzed thereby, and a second portion 156 of the exhaust flows through filter section 148 and is filtered thereby. The exhaust flow through catalytic section 142 is unfiltered. In FIG. 9, housing inlet 176 supplies engine exhaust to both sections 142 and 148, and housing outlet 178 receives exhaust from both sections 142 and 148 including a first catalyzed exhaust portion 162 and a second filtered exhaust portion 158. In FIG. 10, sections 142 and 148 are in series such that engine exhaust flows serially through each. In FIG. 10, housing inlet 186 supplies engine exhaust to section 142, and housing outlet 180 receives engine exhaust from section 148, the exhaust at outlet 180 being both catalyzed and filtered.

It is recognized that various equivalents, alternatives and modifications are possible within the scope of the appended claims.

What is claimed is:

1. An exhaust aftertreatment filter for internal combustion engine exhaust comprising an axially extending cylindrical filter roll comprising pleated filter media defining a plurality of axially extending flow channels, and having a first open-flow section with open flow channels, and a second filtering section with alternately sealed flow channels forcing exhaust to flow through said pleated filter media, wherein said open-flow section is a central inner section, and said filtering section is an outer annular section around said inner section.

2. An exhaust aftertreatment filter for internal combustion engine exhaust comprising an axially extending cylindrical filter roll comprising pleated filter media defining a plurality of axially extending flow channels, and having a first open-flow section with open flow channels, and a second filtering section with alternately sealed flow channels forcing exhaust to flow through said pleated filter media, wherein said filter roll is spiral-wound from a sheet having corrugated serpentine pleats extending axially therealong and providing said pleated filter media having said plurality of axially extending flow channels, and comprising first and second axially spaced sealing beads extending laterally across said pleats and alternately sealing said flow channels, said sheet being wound from a starting side to a terminating side, said beads being laterally spaced from one of said starting and terminating sides to provide unsealed flow channels providing said open-flow section of said filter roll when wound.

3. The invention according to claim 2 wherein said beads are laterally spaced from said starting side.

4. The invention according to claim 2 wherein said beads are laterally spaced from said terminating side.

5. An exhaust aftertreatment filter for filtering internal combustion engine exhaust flowing along an axial direction, comprising an axially extending cylindrical filter roll having a plurality of concentric layers with pleats therebetween defined by wall segments extending radially in corrugated serpentine manner between pleat tips at axially extending bend lines, said wall segments extending axially between first and second distally opposite axial ends, said wall segments defining axial flow channels therebetween, said filter roll having a central inner section, and an outer annular section around said inner section, the wall segments of said outer section being alternately sealed to each other by a first set of plugs to define a first set of flow channels closed by said plugs, and a second set of flow channels interdigitated with said first set of flow channels and having open first axial ends, said wall segments of said outer section being alternately sealed to each other by a second set of plugs axially spaced from said first set of plugs and closing said second set of flow channels, said first set of flow channels having open second axial ends, the wall segments of said inner section defining a third set of flow channels open at both the first and second axial ends.

6. The invention according claim 5 wherein wall segments of said inner section are axially recessed from the first axial ends of said wall segments of said outer section.

7. The invention according to claim 6 wherein said filter roll has an inner central face at the first axial ends of said wall segments of said inner section, and an outer annular face at the first axial ends of said wall segments of said outer section, said inner face being spaced axially from said outer face.

8. The invention according to claim 5 further comprising in combination an axially extending housing enclosing said filter roll and having axially distally opposite first and second plenums, an inlet port in said first plenum, an outlet port in said second plenum, such that engine exhaust flows into said first plenum from said first inlet port, and then flows in parallel through said inner and outer sections to said second plenum for exit at said outlet port, said engine exhaust flowing from said inlet plenum through said third set of flow channels from the open first axial ends thereof to the open second axial ends thereof then into said second plenum, said engine exhaust also flowing from said inlet plenum into the open first axial ends of said second set of flow channels and then being filtered by passage through said wall segments of said outer section and then flowing out of the open second axial ends of said first set of flow channels into said second plenum.

9. The invention according to claim 5 further comprising in combination an axially extending housing enclosing said filter roll and having axially distally opposite first and second plenums, an outlet port in said first plenum, an inlet tube supplying engine exhaust to the first axial end of said inner section to supply exhaust to the first axial ends of said third set of flow channels, such that engine exhaust flows through said third set of flow channels from the open first axial ends thereof to the open second axial ends thereof, then into said second plenum wherein exhaust flow reverses and flows into the open second axial ends of said first set of flow channels and then is filtered by passing through said wall segments of said outer section and flows out of the open first axial ends of said second set of flow channels into said first plenum and then to said outlet port.

10. The invention according to claim 9 wherein said first plenum has an inlet port, and said inlet tube extends from said inlet port through said first plenum to said first axial end of said inner section.

11. The invention according to claim 5 further comprising in combination an axially extending housing enclosing said filter roll and having axially distally opposite first and second plenums, an inlet port in said first plenum, an outlet tube extending from the first axial end of said inner section, such that engine exhaust flows into said first plenum from said inlet port, then into the open first axial ends of said second set of flow channels and then is filtered by passing through said wall segments of said outer section and then flows out of the open second axial ends of said first set of flow channels into said second plenum wherein exhaust flow reverses and flows trough said third set of flow channels from the open second axial ends thereof to the open first axial ends thereof, then through said outlet tube.

12. The invention according to claim 11 wherein said first plenum has an outlet port, and said outlet tube extends from said first axial end of said inner section through said first plenum to said outlet port.

13. The invention according to claim 5 wherein said filter roll is spiral-wound from a sheet having said corrugated serpentine pleats thereon, said first and second sets of plugs being provided by first and second axially spaced sealing beads extending laterally across said pleats, said sheet being wound from a staffing side to a terminating side, said beads being laterally spaced from said starting side to provide said third set of flow channels as open unsealed flow channels through said inner section of said filter roll when wound.

14. The invention according to claim 13 wherein said sheet has a cut-out section along said starting side and along said first axial end, such that after said winding, the first axial ends of said wall segments of said inner section are axially recessed from the first axial ends of said wall segments of said outer section.

* * * * *